3,212,614
COMBINED PARKING METER AND TOKEN DISPENSER WITH REPLACEABLE MAGAZINE

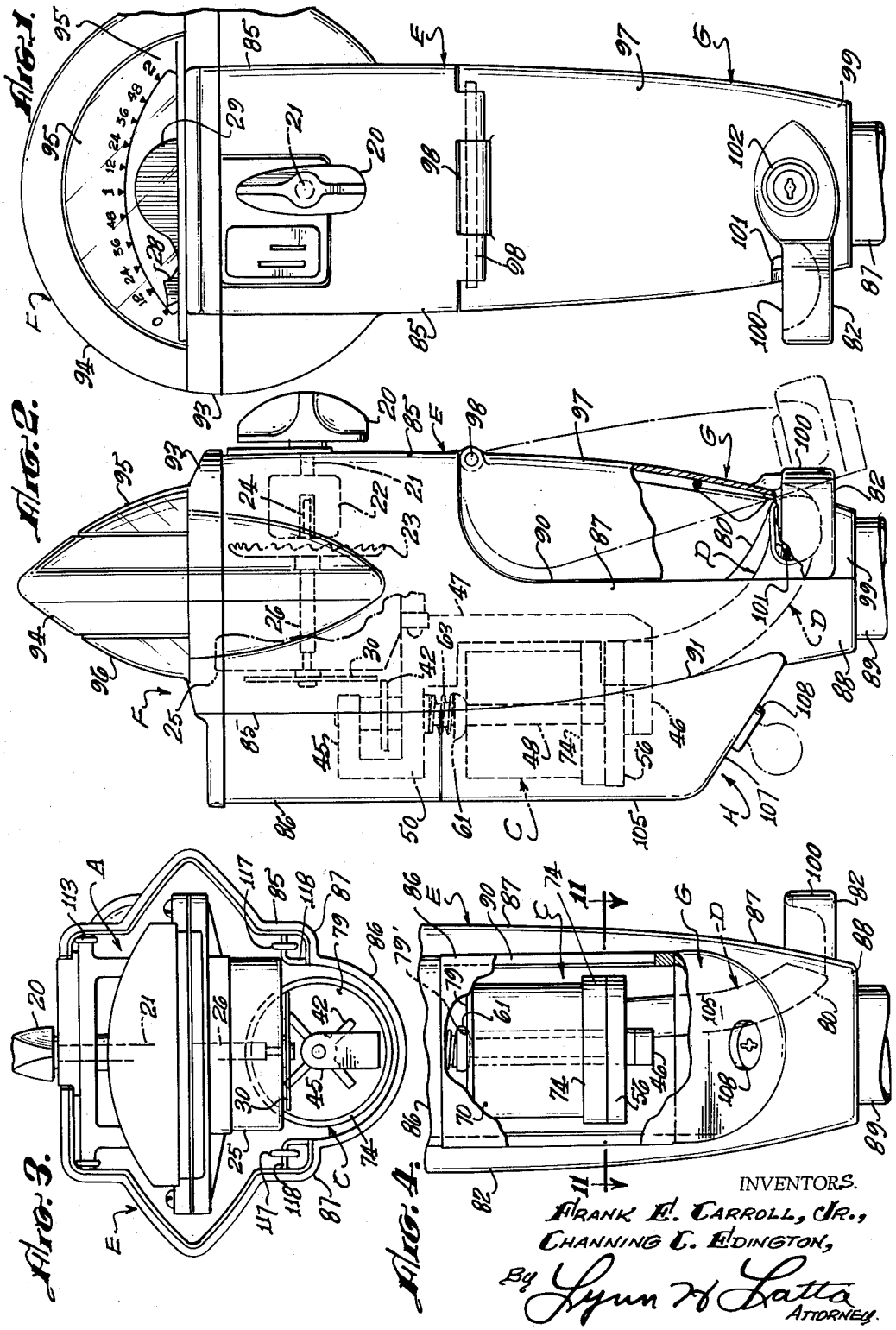

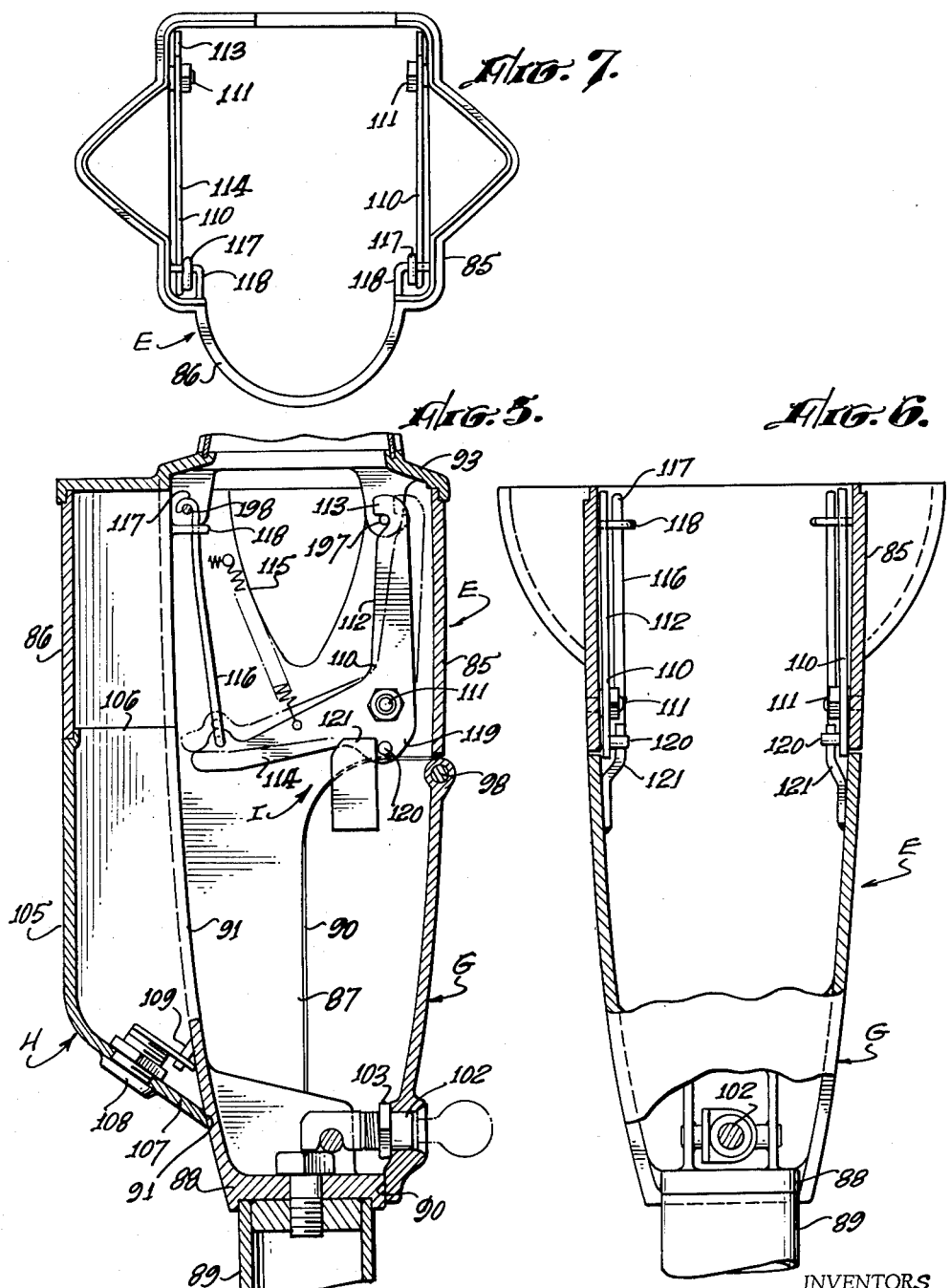

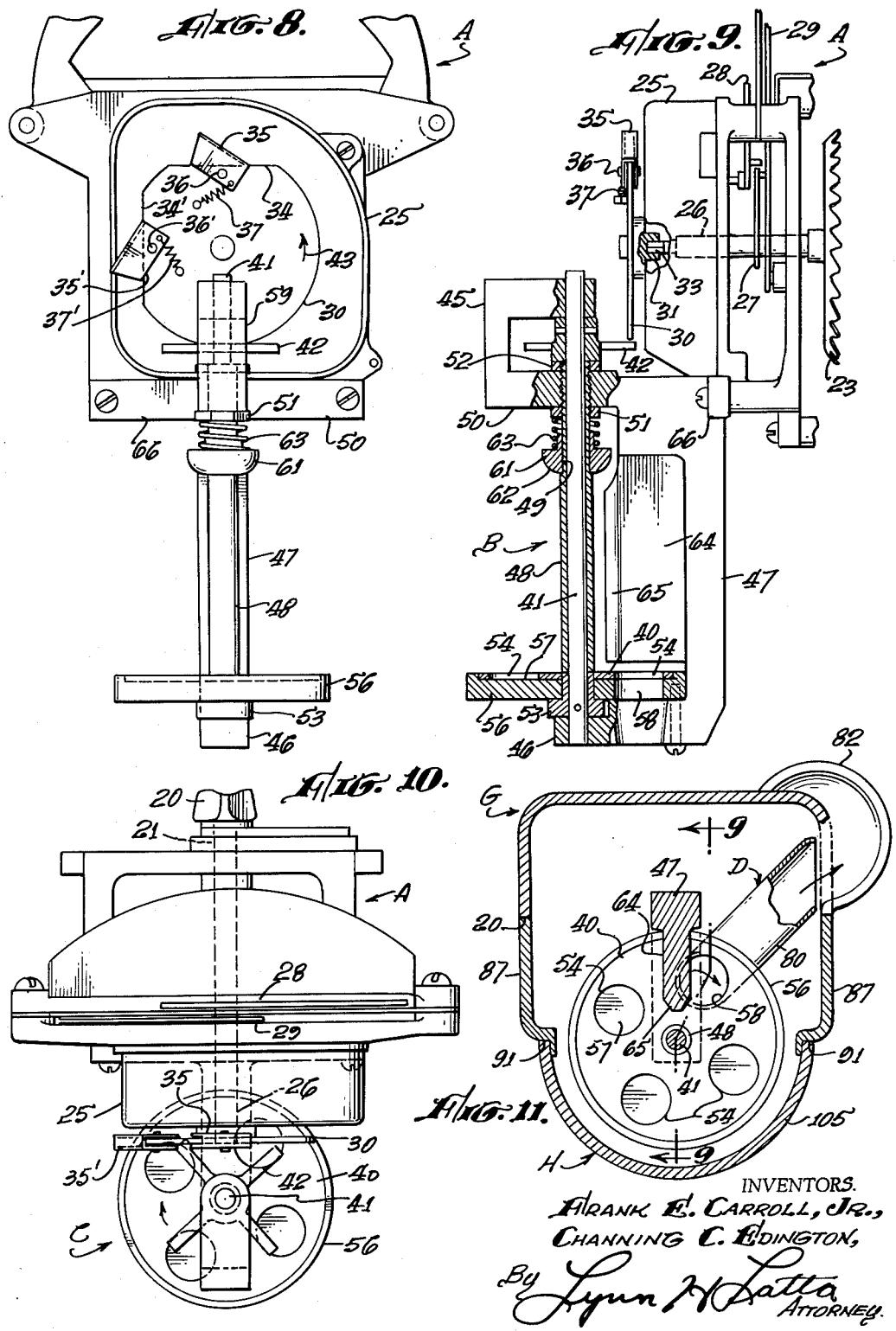

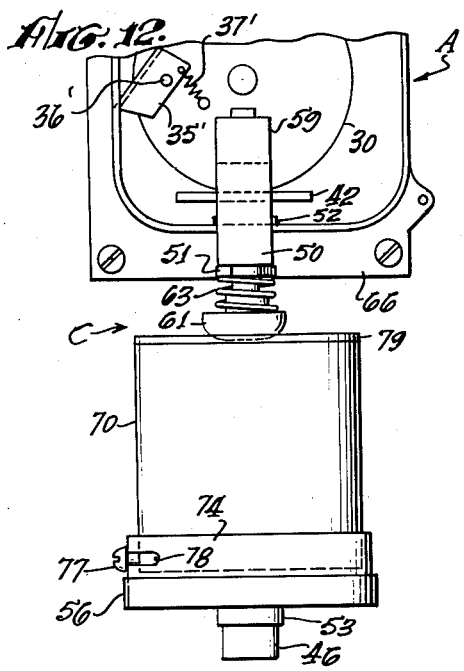
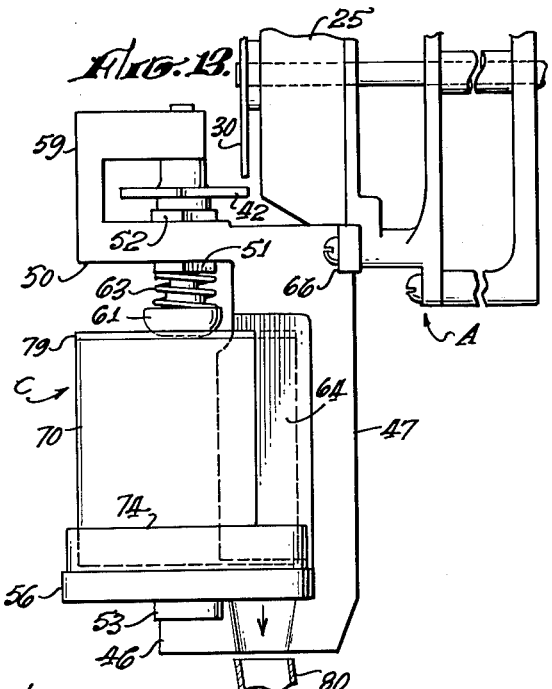
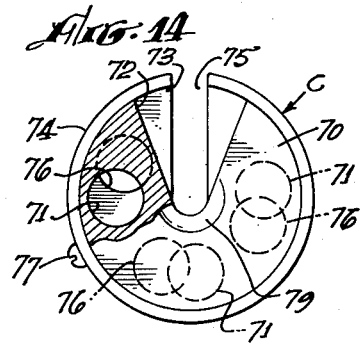
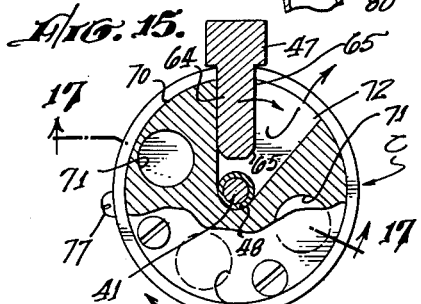
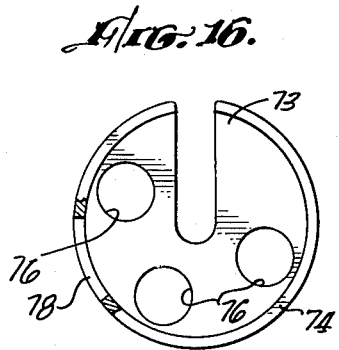
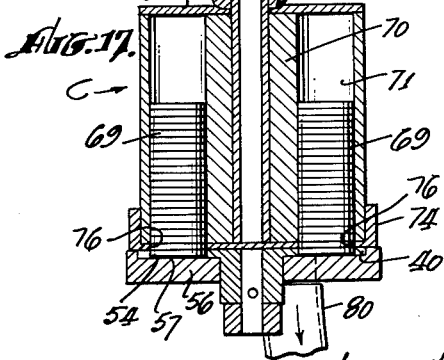

Frank E. Carroll, Jr., 4465 Petit Ave., Encino, Calif., and Channing C. Edington, 3351 Woodcliff Road, Sherman Oaks, Calif.
Filed Mar. 4, 1963, Ser. No. 262,763
11 Claims. (Cl. 194—2)

This invention relates to apparatus for dispensing redeemable tokens from coin operated mechanisms such as parking meters and analogous devices, its general object being to provide a vending apparatus which, in addition to its conventional function of vending a service or product (e.g., registering paid parking time on a meter) has the additional function of issuing a token or other evidence of the payment for the parking time or other service or product, which token can be negotiated to a merchant or other sponsor so as to obtain a refund of all or a portion of the amount paid for the parking time or other service or product, or to obtain a credit on a purchase.

A further object of the invention is to provide a token-issuing device adapted for embodiment in a common type of existing parking meter apparatus in an arrangement such that the existing actuator mechanism of the meter or the like will be effective to actuate the token-dispensing mechanism in addition to its established function of actuating the meter.

The present invention is directed particularly to a number of problems that have arisen in connection with the development of a token dispensing apparatus of this kind. One of those problems is that of limited token-holding and dispensing capacity in the earlier apparatuses. A major object of the present invention is to provide an apparatus of this kind which has a greatly enlarged capacity for holding and dispensing tokens, with a corresponding reduction in the cost of servicing meters in the refilling of the token magazine. Another problem which has been reflected in high servicing cost, is that of the time consumption in the loading of a token magazine, and as a solution for this problem, the present invention aims to provide a removable and replaceable magazine unit which can be machine-loaded at a central operating plant and can be inserted into the meter in a pre-loaded condition by the service operator, after removal of an empty or partially empty magazine from the meter, thus further reducing operating costs by minimizing the required servicing time and by reducing the frequency with which the service calls must be made.

A further object of the invention is to provide a removable, preloadable cartridge and cartridge holding mechanism in which the bottom of the cartridge is closed to prevent drop-out of tokens while the cartridge is outside the meter, and in which a dispensing port in the bottom of the cartridge is opened for the release of tokens upon the installation of the cartridge in the meter.

A further object of the invention is to provide a vending apparatus of the type herein contemplated, having improved latching mechanism for latching down a servicing-access cover to the top of the housing, in combination with a coin receptacle access door in the lower portion of the lateral wall of the housing, such door having means for automatically actuating and locking the top cover latching mechanism simultaneously with the locking of the door to the housing.

Other objects and advantages will become apparent in the ensuing specification and appended drawing in which:

FIG. 1 is a front elevational view of a combined parking meter and token dispenser embodying our invention;

FIG. 2 is a side elevational view of the same, the coin-access door being shown in phantom in partially open position;

FIG. 3 is a plan view of the apparatus;

FIG. 4 is a fragmentary rear elevational view of the apparatus with parts broken away to disclose internal mechanism;

FIG. 5 is a vertical axial sectional view of the housing of the apparatus, with the internal working units removed, illustrating the conjointly operable latching and locking mechanisms for the top cover and coin-access door; and also illustrating the separate removable token cover;

FIG. 6 is a front elevational view of the main housing body and coin-access door, partially broken away and shown in section;

FIG. 7 is a plan view of the main housing body and associated parts, the top cover being removed;

FIG. 8 is a rear elevational view of the assembly of token dispensing actuator parts and coin operated timer unit;

FIG. 9 is a side elevational view of the same with parts of the token dispenser actuator assembly shown in section, taken as indicated by line 9—9 of FIG. 11;

FIG. 10 is a plan view of the same;

FIG. 11 is a transverse sectional view of the apparatus taken on the line 11—11 of FIG. 4;

FIG. 12 is a fragmentary rear elevational view of the assembly of token cartridge and its dispensing actuator mechanism;

FIG. 13 is a fragmentary side elevational view of the same;

FIG. 14 is a top plan view of the token cartridge in its lock-out condition (as removed from the meter), parts being broken away and shown in section;

FIG. 15 is a top plan view of the cartridge as installed in the token dispensing unit and shifted from the lock-out position to dispensing position, parts being broken away and shown in section;

FIG. 16 is a horizontal sectional view through the cartridge case, looking downwardly and viewing the bottom thereof; and FIG. 17 is a vertical axial sectional view of the cartridge in operating position in the token dispensing apparatus.

General description

Referring now to the drawings in detail, we have shown therein, as an example of one form in which the invention may be embodied, a combined parking meter and token dispensing apparatus comprising, in general, a coin operated parking time indicating meter unit A (FIG. 9); a token dispensing actuator mechanism B associated with and driven by the meter unit A; a token magazine C associated with the dispensing unit B (FIGS. 12–18); a token delivery chute and receptacle assembly D (FIGS. 2, 4, 11); a housing and cover assembly (FIGS. 1–3) comprising a main housing body E, a top cover F, a coin-access door G and a token-loading door H; and a combined cover latching and coin door locking apparatus I (FIG. 5).

Detailed description

*Meter unit A* (FIGS. 1–3, 8–10) embodies a manual actuator crank 20 (FIG. 2) secured to the outer end of an actuator shaft 21 which extends through the front wall of housing body E; a coin-connected coupling comprising a coin holding head 22 mounted on the shaft 21 and oscillated thereby, and toothed driven disc 23 which is coupled to the head 22 when a coin is deposited in the coin holding slot 24 of the latter, and a timer 25 shaft 26 driven by the disc 23 and which, through a suitable cam or cams thereon, operates the various indicator parts including the expired time indicating pointer 28, time expired flag or violation flag 29 etc. All of these elements are parts of a conventional parking meter—the Duncan meter being illustrated. The timer shaft 26 is turned in one direction to wind the timer in response to manual actuation of crank 20, the indicator parts 28, 29 being set to proper indicating position for the time purchased by the coin, and upon release of the crank, the shaft 26 is driven slowly in the opposite direction by the spring motor (not shown) of the timer, gradually returning the pointer 28 to zero time indicating position and finally actuating the other parts, such as flag 29, to expired time or violation indicating position.

*Token dispensing actuator unit B* (FIGS. 8–11) comprises an actuator disc 30 having a hub 31 with a drive socket fitted over and secured to a driving tip 33 on the rear end of shaft 26, whereby the disc 30 is driven by shaft 26.

Disc 30 (FIG. 8) has a plurality of chordal sides 34, 34'. Actuator pawls 35, 35', of stamped sheet metal yoke or equivalent structure (FIG. 9) having spaced wings embracing the chordal sides 34, 34' of the disc, are attached to the disc 30 by respective pivots 36, 36' and are yieldingly maintained normally in the projected positions shown in FIG. 8 by means of small coil springs 37, 37' each connected under tension between a respective wing and an anchor rivet on disc 30. The limit position of projection of each pawl is determined by engagement of one end of its bridging web against the respective chordal side 34 or 34'. Any preferred number of pawls may be utilized. There may be 2, 3, 4 or possibly more, to match the number of time periods for which the meter is to respond, in one actuation.

Token dispensing is effected by a rotatable dispensing disc 40 mounted on a vertical shaft 41 to the upper end of which is secured a star wheel 42 (FIG. 10) the spokes of which are positioned to intersect the path of orbiting movement of actuator pawls 35, 35'. Driving movement is transmitted to the star wheel 42 by one or more of the pawls 35, 35' by rotation of disc 30 in the direction indicated by arrow 43 in FIG. 8, such rotation being transmitted to the disc during the manually operated meter winding operation. During the spring-driven reverse rotation of the disc 30 by the timer 25 during the purchased-time period, the pawl or pawls 35, 35' will establish camming engagement with star wheel 42, yielding inwardly against the pull of the springs 37, 37' so as to pass the star wheel without transmitting movement thereto.

Dispenser shaft 41 has its lower end journalled in a cylindrical bearing bore 45 in the lower arm 46 of a mounting bracket 47 and its intermediate portion rotates within a sleeve 48 which has a reduced upper end 49 the tip of which is threaded into an upper arm 50 of bracket 47 and secured by lock nuts 51 and 52.

The upper end of dispenser shaft 41 may be journalled in the upper arm of an extension yoke 45 of bracket 47. Disc 40 has a plurality of feed ports 54 equidistantly spaced in circumferential array around its axis at a uniform distance therefrom.

The dispensing disc 40 is mounted on a hub 53 which is pinned or otherwise suitably secured to shaft 41. Hub 53 may be in the form of a headed thimble with its upper end pressed into the disc 40, and rotatably mounted in a bearing bore in the center of a bottom disc 56. Bottom disc 56 has in its upper face a shallow circular depression providing a flat bearing seat 57 upon which tokens disposed in feed ports 54 of dispensing disc 40 may slide as the disc 40 is rotated, until they reach a discharge port 58 in the bottom disc 56, through which a token may be discharged into the token delivery chute and receptacle assembly D. Disc 56 is fixedly mounted on bracket arm 46.

Axially slidable upon the reduced upper end portion 49 of sleeve 48 is a pilot collar 61 having a conical male bearing surface 62. Collar 61 is spring-loaded by a coil spring 63 encircling the upper sleeve portion 49 and engaged under compression between the collar 61 and the nut 51.

Bracket 47 has an integral flat guide key 65 projecting rearwardly from its vertical arm in an axial plane of the shaft 41. Guide key 64 has a bevelled rear edge 65 disposed in adjacent, parallel relation to sleeve 48, for piloting entry into token magazine C.

At its upper end, bracket 47 has an integral cross head 66 by means of which it is attached to the frame structure of timer unit A.

*Token magazine C* (FIGS. 2, 4, 12–17) holds a plurality of stacks of tokens 69 (FIG. 17) which are successively engaged by dispensing disc 40, carried circumferentially to discharge outlet 58, and dropped into chute 80. While the magazine herein disclosed will hold three stacks of tokens, it is possible to utilize a magazine holding four, five or even more token stacks, depending on the size of the tokens and/or of the magazine. Magazine C comprises a cylindrical magazine body 70 (FIGS. 14–18) formed with a plurality of token-holding barrels 71 extending vertically parallel to its major axis, positioned in spaced circumferential array corresponding to the positioning of feed ports 54 of the dispensing disc 40 (with the exception that the number of barrels 71 is one less than the number of ports 54). In the area where the one barrel is omitted, the magazine body 70 has a wedge shaped recess 72 disposed with its apex at the major axis thereof and having side walls flaring outwardly to its periphery. Recess 72 receives the sleeve 48 and the guide 64 when the magazine is installed.

Magazine body 70 is mounted in a dish-shaped token-retainer lockout plate having a flat bottom 73 and a cylindrical rim 74 within which the lower end of body 70 is rotatably received. Bottom 73 has a radial slot 75 adapted to receive the guide 64, and a plurality of token-release ports 76 corresponding in number and position to the barrels 71. It may now be seen that by rotating the lockout plate 73, 74 to a proper position, the release ports 76 will be brought into registration with the barrels 71. This position is shown in FIG. 15. On the other hand, by rotating the lockout plate 73, 74 to the position shown in FIG. 14, its release ports 76 are displaced circumferentially from the lower ends of barrels 71 so that columns of tokens disposed in the barrels 71 will be supported on bottom 73 and retained against dropping out of the magazine. The two positions just described are limit positions of rotation of the lockout plate determined by a stop screw or pin 77 extending through a circumferential slot 78 in the rim 74 (FIG. 16) and adapted to engage against the respective ends of the slot.

When the magazine is installed, its release ports 76 will be disposed directly above the feed ports 54 of dispensing disc 40 at a time when the dispensing port of disc 40 is disposed over the discharge outlet 58 in bottom disc 56. Thus, in the operation of the apparatus, when the dispensing disc 40 comes to a stop following a stage of rotation thereof during the setting of time on the parking meter, its feed ports 54 will come into registration with the release ports 76 of lockout plate 73, 74, and from one of the release ports 76 a token will drop into its registering feed port 54 to replace a token that was delivered from that port in a previous operation.

The engagement of guide key 64 in slot 75 will determine the registration of the magazine with dispensing chute assembly D so that dropout of a token into the chute will occur at the completion of a stage of rotation of dispensing disc 40 (at the same time that a token drops from a stack 69 in a barrel 71 into a previously emptied feed port 54, and comes to rest against the seat 57 of bottom disc 56).

Magazine C has a closed top 79 closing the upper ends of barrels 71 and provided in its center with a dished annular bearing recess 79' (FIG. 17) in which the bearing end of a pilot collar 62 is engageable to locate the upper end of the magazine. Collar 62 is yieldingly maintained in such piloting engagement with the magazine top 79 by the loading spring 63. The recess 79' communicates with the upper extremity of body recess 72, but it is necessary for the collar 62 to be raised slightly in order to release the piloting engagement of trunnion 62 in recess 79' during insertion and removal of the magazine. Top 79 may either be integral with magazine body 70 or formed as a separate disc and secured thereto.

*Delivery chute and receptacle assembly D* (FIGS. 2, 4) comprises a tubular chute 80 suitably secured in housing body E, its upper end registering with discharge port 58 to receive tokens therefrom, extending downwardly therefrom, and its lower end portion curved diagonally forwardly and to the left side of housing E as viewed from the front, and positioned to deliver tokens into a receptacle 82 formed as an integral part of access door G.

*Housing body E* (FIGS. 1–7) has an upper portion 85 of generally rectangular tubular form, modified by a semi-cylindrical bay 86 projecting from its rear side; and a yoke section comprising arms 87 at its opposite sides, projecting downwardly and terminating at its lower end in a base 88 adapted for attachment to the upper end of a conventional meter pedestal 89. Defined between the forward edges of arms 87 and an overhanging shoulder of upper housing section 85 is a doorway 90 for the access door G. Defined between the rear edges of arms 87 and the lower extremity of bay 86 is a doorway 91 for the token loading door H.

*Top cover F* comprises a cover plate 93 (FIGS. 1, 2 and 5) shaped to cover the top portion 85 and its bay 86 of housing body E; and a dome 94 having front and rear windows closed by transparent lenses 95 and 96 respectively, through which the dials and the indicator parts 28, 29 of the meter unit A can be viewed (FIG. 1).

In its underside, cover plate 93 is provided, fore and aft, with keeper pins 197 and 198 (FIG. 5) at both sides, for co-action with the latching and locking mechanism I.

*Coin access door G* (FIGS. 1, 2, 5) comprises a door body 97 contoured to symmetrically complement the lower rear portion of the housing E defined by arms 87; having at its upper forward corner a hinge 98 attaching it to the lower forward extremity of the upper housing portion 85, and having at its lower end a half-collar 99 matching the base 88, and an integral token cup 100 communicating through a discharge aperture 101 with the lower end of the token chute 80.

Adjacent the token cup 100 is a boss in which is mounted a lock 102, the barrel of which may be secured by a jam nut 103 engaged against the inner end of the boss.

*Token loading door H* comprises a semi-cylindrical body portion 105 having at its upper end a semi-circular coupling lip 106 which is receivable in the open lower end of bay 86 to secure the upper end of the door; and having a downwardly and inwardly slanted bottom 107 with a margin contoured to fit around the base portion 86 of housing body E. A lock 108, mounted in the sloping bottom 107, cooperates with a keeper lug 109 on base 88 to lock the lower end of cover 105 to the housing body E. The cover 105 is contoured to receive the outer side of magazine C when installed in the apparatus. (FIGS. 1 and 3.)

*Latching and locking apparatus I* (FIGS. 5–7) comprises a pair of bell crank latch levers 110 pivoted to respective sides of the upper housing body section 85 on respective pivots 111. Each bell crank 110 has a latch arm 112 projecting upwardly from its pivot 111 and terminating in a latch hook 113 which is engageable with a respective keeper pin 197; and an actuating arm 114 projecting rearwardly from its respective pivot 111 and spring loaded upwardly by a coil spring 115 the upper end of which is anchored to a respective side of upper housing section 85 and the lower end of which is attached to the respective arm 114. The spring loading operates to unlatch the hook 113 from its respective keeper pin 197 when the respective bell crank is freed for swinging movement on its pivot 111.

To the rear end of each actuator arm 114 is pivotally linked the shank 116 of a latch hook 117 which is engageable with a respective end of the keeper rod 198 which extends from side to side of cover plate 93. Just below the hook 117, the shank 116 is axially slidable in a bearing eye 118 secured in an upper rear corner of upper housing section 85, in a horizontal plane.

Each bell crank 110 has a heel portion 119 projecting downwardly from its respective pivot 111 and provided with an abutment pin 120 adapted to be engaged by a locking finger 121 projecting upwardly from a respective side of coin access door G. When the door G is fully closed and locked, fingers 121 will have moved the respective bell cranks 110, in a counterclockwise direction as viewed in FIG. 5, to the full line position shown in that figure, in which the respective latch hooks 113 and 117 are in latching engagement with their respective keeper pins 197, 198. On the other hand, when coin access door G is unlocked and swung outwardly and upwardly, locking fingers 121 will swing away from abutment pins 120 sufficiently to permit the loading springs 115 to tilt the levers 110 to the dotted line position shown in FIG. 5, in which the keeper pins 197, 198 are released by the hooks 113, 117 thus unlatching the top cover F so that it may be lifted off the housing. It will now be apparent that the locking of coin access door G in its closed position automatically effects locking of the top cover F to the top of the housing, so that it can not be removed.

Operation

The invention provides for rapid servicing of both the meter per se and the token dispensing mechanism. A token mechanism service man needs only to unlock the token-loading door H, remove it, grasp the magazine body 70 of magazine unit C, rotate it counter-clockwise (as viewed from above) from the dispensing position shown in FIG. 15 to the lockout position shown in FIG. 14, then slide the magazine rearwardly out of the housing, its lockout plate bottom 73 sliding against the flat upper face of dispensing disc 40.

In servicing the parking meter, the meter service man need only unlock front door 97 both for collection of coins and for service of the meter. For collection of coins he merely opens the door and the coins will drop into a collection device (i.e., coin receptacle with a funnel). For service of the meter, after unlocking door 97, he removes top cover from housing E, then lifts out the entire unit including the token mechanism.

We claim:

1. A redeemable token-dispensing apparatus for use in a parking meter having a timer shaft and a meter-setting device arranged to be coin-coupled to said timer shaft for setting the meter to indicate purchased parking time, said apparatus comprising: a rotary token dispensing disc having a plurality of circumferentially spaced token-holding feed ports; a shaft on which said disc is mounted for rotation in a substantially horizontal plane; a drive-receiving element on said shaft, axially spaced above said disc; a one-way drive element attachable to said timer shaft and operable to transmit rotation to said drive-receiving element for rotating said disc; a bottom member providing a token-supporting seat above which said disc is rotatable and providing a magazine support; a token magazine including a body having a lower end adapted to be supported on said bottom member, having in one side a slot to receive said shaft, and having a plurality of token-holding barrels communicable with said dispensing disc and with the feed ports therein when said lower end is registered with said bottom member; retainer means operable to retain the tokens in said barrels with the magazine is removed from said bottom member; and a discharge outlet in said bottom member, through which tokens may be dispensed by rotation of said disc, the tokens dropping from the lower ends of said barrels into said feed ports and from said feed ports into said outlet as the disc is rotated; a fixed sleeve surround said shaft and receivable in said slot; and a pilot collar axially slidable on said sleeve, related to said magazine for mating engagement with the upper end of the magazine and spring-loaded for yieldingly retaining said magazine in coupled registration with said bottom member.

2. A redeemable token-dispensing apparatus for use in a parking meter having a timer shaft and a meter-setting device arranged to be coin-coupled to said timer shaft for setting the meter to indicate purchased parking time, said apparatus comprising: a rotary token-dispensing disc having a plurality of circumferentially spaced token-holding feed ports; a shaft on which said disc is mounted for rotation in a substantially horizontal plane; a drive-receiving element on said shaft, axially spaced above said disc; a one-way drive element attachable to said timer shaft and operable to transmit rotation to said drive-receiving element for rotating said disc; a bottom member providing a token-supporting seat above which said disc is rotatable and providing a magazine support; a token magazine including a body having a lower end adapted to be supported on said bottom member, having in one side a slot to receive said shaft, and having a plurality of token-holding barrels communicable with said dispensing disc and with the feed ports therein when said lower end is registered with said bottom member; a discharge outlet in said bottom member, through which tokens may be dispensed by rotation of said disc, the tokens dropping from the lower ends of said barrels into said feed ports and from said feed ports into said outlet as the disc is rotated; retainer means operable to retain the tokens in said barrels when the magazine is removed from said bottom member; said retainer means comprising a lockout plate having a plurality of token-release ports arranged for registration with the lower ends of said barrels, said plate being pivotally attached to the lower end of said magazine body for limited rotation such as to displace said release ports out of registration with said barrels so as to retain the tokens therein.

3. Apparatus as defined in claim 2, wherein said bottom member is dished so as to provide in its upper face a depression into which the lower end of said magazine may be coupled to locate said magazine in operative registration with said bottom member.

4. Apparatus as defined in claim 3, wherein said lockout plate has a rim in which the lower end of said magazine body is rotatably mounted, and is contoured for reception in said recess to effect said coupling.

5. A redeemable token-dispensing apparatus for use in a parking meter having a timer shaft and a meter-setting device arranged to be coin-coupled to said timer shaft for setting the meter to indicate purchased parking time, said apparatus comprising: a rotary token-dispensing disc having a plurality of circumferentially spaced token-holding feed ports; a shaft on which said disc is mounted for rotation in a substantially horizontal plane; a drive-receiving element on said shaft, axially spaced above said disc; a one-way drive element attachable to said timer shaft and operable to transmit rotation to said drive-receiving element for rotating said disc; a bottom member providing a token-supporting seat above which said disc is rotatable and providing a magazine support; a token magazine including a body having a lower end adapted to be supported on said bottom member, having in one side a slot to receive said shaft, and having a plurality of token-holding barrels communicable with said dispensing disc and with the feed ports therein when said lower end is registered with said bottom member; a discharge outlet in said bottom member, through which tokens may be dispensed by rotation of said disc, the tokens dropping from the lower ends of said barrels into said feed ports and from said feed ports into said outlet as the disc is rotated; retainer means operable to retain the tokens in said barrels when the magazine is removed from said bottom member; a fixed sleeve surrounding said shaft and receivable in said slot; a pilot collar axially slidable on said sleeve, said magazine having in its upper end a dished recess in which said pilot collar is adapted to mate; and spring-loading means comprising a coil spring engaged against the top of said collar and an abutment engaging the upper end of said spring under compression for yieldingly retaining said magazine in coupled registration with said bottom member.

6. A redeemable token-dispensing apparatus for use in a parking meter having a timer shaft and a meter-setting device arranged to be coin-coupled to said timer shaft for setting the meter to indicate purchased parking time, said apparatus comprising: a rotary token-dispensing disc having a plurality of circumferentially spaced token-holding feed ports; a shaft on which said disc is mounted for rotation in a substantially horizontal plane; a drive-receiving element on said shaft, axially spaced above said disc; a one-way drive element attachable to said timer shaft and operable to transmit rotation to said drive-receiving element for rotating said disc; a bottom member providing a token-supporting seat above which said disc is rotatable and providing a magazine support; a token magazine including a body having a lower end adapted to be supported on said bottom member, having in one side a slot to receive said shaft, and having a plurality of token-holding barrels communicable with said dispensing disc and with the feed ports therein when said lower end is registered with said bottom member; a discharge outlet in said bottom member, through which tokens may be dispensed by rotation of said disc, the tokens dropping from the lower ends of said barrels into said feed ports and from said feed ports into said outlet as the disc is rotated; retainer means operable to retain the tokens in said barrels when the magazine is removed from said bottom member; said drive element comprising; a disc fixed on the end of said timer shaft, a plurality of drive-transmitting pawls pivotally attached to the periphery of said disc, spring means biasing said pawls to normal position projecting from said disc periphery and engageable with said drive-receiving element; and stop means on said disc, engageable with said pawls in their said projected positions and bracing them in said positions for transmitting drive, said pawls being yieldingly retractable in response to engagement with said drive-receiving element during retrograde rotation of said one-way drive element in response to time-expiring running of said meter.

7. A redeemable token-dispensing apparatus for use in a parking meter having a timer shaft and a meter-setting device arranged to be coin-coupled to said timer shaft for setting the meter to indicate purchased parking time, said apparatus comprising: a rotary token-dispensing disc having a plurality of circumferentially spaced token-holding feed ports; a shaft on which said disc is mounted for rotation in a substantially horizontal plane; a drive-receiving element on said shaft, axially spaced above said disc; a one-way drive element attachable to said timer shaft and operable to transmit rotation to said drive-receiving element for rotating said disc; a bottom member providing a token-supporting seat above which said disc is rotatable and providing a magazine support; a token magazine including a body having a lower end adapted to be supported on said bottom member, having in one side a slot to receive said shaft, and having a plurality of token-holding barrels communicable with said dispensing disc and with the feed ports therein when said lower end is registered with said bottom member; a discharge outlet in said bottom member, through which tokens may be dispensed by rotation of said disc, the tokens dropping from the lower ends of said barrels into said feed ports and from said feed ports into said outlet as the disc is rotated; retainer means operable to retain the tokens in said barrels when the magazine is removed from said bottom member; said drive receiving element consisting of a star wheel having radial arms projecting into the path of rotation of said one-way drive element.

8. In combination; a housing; parking meter mechanism in said housing on one side thereof, said mechanism including a timer having a horizontal shaft, and a meter-setting device having means for coin-coupling thereof to said timer shaft for setting the meter to indicate purchased parking time; and a redeemable token-dispensing apparatus within the other side of said housing, said apparatus comprising a one-way drive element secured to the end of said timer shaft remote from said meter-setting device; a drive-receiving element positioned for rotation in a substantially horizontal plane and for receiving drive from said drive element; a shaft on the upper end of which said drive-receiving element is secured, said shaft extending downwardly therefrom; a token-dispensing disc secured to the lower end of said shaft for rotation in a substantially horizontal plane, said disc having a plurality of circumferentially-spaced token-holding feed ports; a bottom member providing a token-supporting seat above which said disc is rotatable and providing a magazine support; a token magazine including a body having a lower end adapted to be supported on said bottom member, having in one side a slot to receive said shaft, and having a plurality of token-holding barrels communicable with said dispensing disc and with the feed ports therein when said lower end is registered with said bottom member; retainer means operable to retain the tokens in said barrels when the magazine is removed from said bottom member; and a discharge outlet in said bottom member, through which tokens may be dispensed by rotation of said disc, the tokens dropping from the lower ends of said barrels into said feed ports and from said feed ports into said outlet as the disc is rotated.

9. The combination defined in claim 8, including a coin-access door in said one side of said housing; a token tray formed in a lower portion of said door; and a token delivery chute extending diagonally downwardly within said housing from said token discharge outlet to said tray and arranged to deliver the discharged tokens into said tray.

10. The combination defined in claim 9, further including a removable top cover having means to latch it to the top of said housing to close the same; a lock to secure said door is closed position; and linkage interconnecting said door and said latch means to operate the latter to latching position in response to movement of said door to closed position.

11. The combination defined in claim 8, further including a token-loading door in said other side of the housing, registering with the space occupied by said magazine in the housing, for removal of a partially emptied magazine and replacement of a token-filled magazine in said space.

References Cited by the Examiner
UNITED STATES PATENTS

| | | |
|---|---|---|
| 465,908 | 12/91 | Whiteside. |
| 961,916 | 6/10 | Van Court et al. _____ 221—265 X |
| 2,070,445 | 2/37 | Miller et al. _____ 194—72 |

SAMUEL F. COLEMAN, *Primary Examiner.*

ERNEST A. FALLER, *Examiner.*